(12) United States Patent
Cregg et al.

(10) Patent No.: US 8,647,127 B2
(45) Date of Patent: Feb. 11, 2014

(54) METHODS AND SYSTEMS FOR DEMONSTRATING DIFFERENCES BETWEEN AND BENEFITS OF PRODUCTS

(71) Applicant: The Procter & Gamble Company, Cincinnati, OH (US)

(72) Inventors: Martin S. Cregg, Skaneateles, NY (US); Robert S. Englert, Jamesville, NY (US); Scott W. Osiecki, Skaneateles, NY (US)

(73) Assignee: The Iams Company, Cincinnati, OH (US)

( * ) Notice: Subject to any disclaimer, the term of this patent is extended or adjusted under 35 U.S.C. 154(b) by 18 days.

(21) Appl. No.: 13/678,623

(22) Filed: Nov. 16, 2012

(65) Prior Publication Data

US 2013/0071832 A1    Mar. 21, 2013

Related U.S. Application Data

(62) Division of application No. 12/242,982, filed on Oct. 1, 2008, now Pat. No. 8,323,033.

(60) Provisional application No. 60/998,556, filed on Oct. 11, 2007.

(51) Int. Cl.
*G09B 25/00*    (2006.01)

(52) U.S. Cl.
USPC .......................................................... 434/367

(58) Field of Classification Search
USPC .......... 434/276, 298, 367, 369, 370, 373, 388
See application file for complete search history.

(56) References Cited

U.S. PATENT DOCUMENTS

| | | | | |
|---|---|---|---|---|
| 1,954,561 | A | * | 4/1934 | Cygon .......................... 434/126 |
| 1,955,962 | A | * | 4/1934 | Jones ............................ 434/367 |
| 1,977,244 | A | * | 10/1934 | Putnam et al. ............... 434/388 |
| 2,099,155 | A | * | 11/1937 | Weber ............................ 40/406 |
| 2,364,609 | A | | 12/1944 | Almquist |
| 2,669,790 | A | | 2/1954 | Wells |
| 2,700,228 | A | * | 1/1955 | Fainman ....................... 434/388 |
| 3,535,798 | A | * | 10/1970 | Turman ......................... 434/126 |
| 3,793,756 | A | | 2/1974 | Kay et al. |
| 4,253,259 | A | | 3/1981 | Schaffer et al. |
| 4,458,435 | A | | 7/1984 | Ackerman |
| 4,531,658 | A | * | 7/1985 | Galopin ..................... 222/181.2 |
| 4,731,028 | A | * | 3/1988 | Dickerson .................... 434/388 |

(Continued)

OTHER PUBLICATIONS

All Office Actions, U.S. Appl. No. 12/242,982.

(Continued)

*Primary Examiner* — Kurt Fernstrom
(74) *Attorney, Agent, or Firm* — Amy M. Foust

(57) ABSTRACT

Disclosed are methods and systems of demonstrating advantages and benefits of premium animal care products, the methods comprising the steps of: presenting a first demonstration aid wherein the first demonstration aid demonstrates a first feature or characteristic; presenting a second demonstration aid wherein the second demonstration aid demonstrates a second feature or characteristic; describing to an audience the first feature or characteristic; describing to an audience the second feature or characteristic; and comparing the first and second features or characteristics to demonstrate the advantages and benefits of the animal care product. The methods and systems can include methods and systems of demonstrating reduced hair ingestion and hairball related effects; methods and systems of demonstrating improvements in skin and coat; and methods and systems of demonstrating better absorption and/or retention of food and nutrients, and production of less waste.

15 Claims, 11 Drawing Sheets

(56) References Cited

U.S. PATENT DOCUMENTS

| | | | |
|---|---|---|---|
| 5,020,719 | A | 6/1991 | Roth et al. |
| 6,027,017 | A | 2/2000 | Kuhn et al. |
| 6,177,107 | B1 | 1/2001 | Watson et al. |
| 6,254,396 | B1 * | 7/2001 | Stevens .................. 434/276 |
| 6,419,497 | B1 | 7/2002 | Carlson |
| 6,629,872 | B2 | 10/2003 | Cheung |
| 6,692,260 | B2 * | 2/2004 | Beck et al. .................. 434/374 |
| 7,076,438 | B1 | 7/2006 | Tobelmann et al. |
| D539,848 | S | 4/2007 | Boutin |
| 7,665,659 | B2 | 2/2010 | Gillespie et al. |
| 2005/0084517 | A1 | 4/2005 | Torney et al. |
| 2006/0053048 | A1 | 3/2006 | Tandetnik |
| 2006/0110719 | A1 | 5/2006 | DeLack Hultin et al. |
| 2007/0117084 | A1 | 5/2007 | Julian et al. |

OTHER PUBLICATIONS

PCT International Search Report related to International Application No. PCT/IB08/54181, dated Nov. 14, 2011—6 pages.

* cited by examiner

METHODS AND SYSTEMS FOR DEMONSTRATING DIFFERENCES BETWEEN AND BENEFITS OF PRODUCTS

CROSS REFERENCE TO RELATED APPLICATIONS

This application is a divisional application of U.S. application Ser. No. 12/242,982, filed on Oct. 1, 2008; which claims the benefit of U.S. Provisional No. 60/998,556, filed on Oct. 11, 2007, each of which is hereby incorporated by reference in its entirety.

FIELD OF THE INVENTION

The present invention is directed to demonstrating benefits of products. In particular, the present invention is directed to methods and systems of demonstrating and comparing differences between, and benefits of, products, particularly wherein such differences and/or benefits are not necessarily easily visualized or understandable.

BACKGROUND OF THE INVENTION

Pet food producers, particularly producers of foods and treats for domestic and/or companion animals such as, but not limited to, dogs, cats, fish, birds, rodents, and horses have increasingly begun to develop premium products which provide greater nutrition and/or higher quality ingredients than do similar standard products of equal amount or volume. Producers of products for human consumption have likewise begun to produce and offer a greater number and variety of so-called premium products.

It is important for the ultimate consumer purchaser, animal healthcare provider, retail and wholesale purchasing and sales personnel, and manufacturer sales personnel to understand the advantages and benefits provided by such premium products. Non-limiting examples of such benefits can include improvements in: skin, hair, coat, vitality, agility, mobility, digestive system, cognitive ability, ocular function, and combinations thereof.

However, it is often difficult to demonstrate the advantages and benefits of such premium products because some such advantages and benefits are not necessarily easily visualized, or the benefits often become evident only over a period of time and thus are not easily noted. Therefore, there is a need for simple, easy-to-understand methods and systems of demonstrating benefits and advantages of premium products.

SUMMARY OF THE INVENTION

The present invention is directed to methods and systems of demonstrating advantages and benefits of an animal care product, the methods including:
   a.) presenting a first demonstration aid wherein the first demonstration aid demonstrates a first feature or characteristic;
   b.) presenting a second demonstration aid wherein the second demonstration aid demonstrates a second feature or characteristic;
   c.) describing to an audience the first feature or characteristic;
   d.) describing to an audience the second feature or characteristic;
   e.) comparing the first and second feature or characteristic; and
   f.) describing the advantages and benefits of the animal care product.

The methods and systems of the invention can include methods and systems of demonstrating reduced hair ingestion and hairball related effects; methods and systems of demonstrating improvements in skin, hair, and coat; and methods and systems of demonstrating better digestion, better absorption and/or retention of food and nutrients, and production of less waste.

DETAILED DESCRIPTION OF THE INVENTION

Figure 1A:
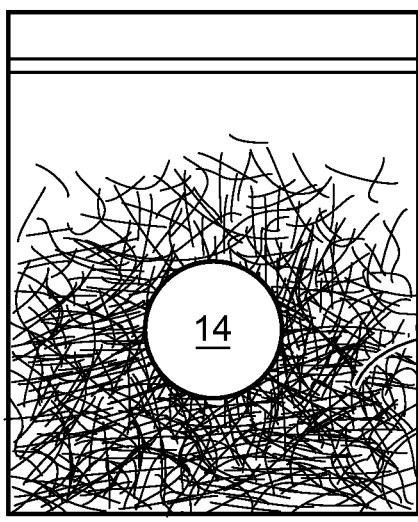
FIG. 1A is a front view of a demonstration aid for use in a method and system for demonstrating hair ingestion by an animal.

Embodiments of the present invention include methods and systems of demonstrating advantages and benefits of a product.

As used herein, the term "product" includes foods, drinks, beverages, treats, toys, supplements, and washing compositions for animals and/or humans.

As used herein, the term "animal care product" includes foods, drinks, beverages, treats, toys, supplements, and washing compositions for animals.

As used herein, the term "describing" includes describing, presenting, demonstrating, explaining, indicating, and providing, or likewise conveying information, including description in one or more languages, live audio and/or visual in-person and/or pre-recorded information, written information in hard copy text, written information viewable on a computer or television screen, pictorial information viewable on a computer or television screen, written, audio, visual and/or pictorial information stored on a computer readable medium, and combinations thereof.

As used herein, the term "instructions" to accompany the demonstration aids, and to aid in executing the methods of the invention includes instructions: presented in one or more languages; in live audio and/or visual in-person and/or pre-recorded form; written in hard copy text; viewable on a computer or television screen; pictorial instructions viewable on a computer or television screen; written, audio, visual and/or pictorial instructions stored on a computer readable medium; diagrams; flow charts; and combinations thereof. Such instruction can be presented and/or stored on paper, photograph, magnetic tape, digital and/or computer readable media, as well as be presented via a global computer network such as the Internet, in person, at a kiosk, via a television and/or computer screen, and combinations thereof.

As used herein, the term "audience" includes retail consumers and/or purchasers purchasing for their own or their animals' consumption or use; buyers purchasing on behalf of a retail and/or wholesale business; sales personnel selling at a retail and/or wholesale business; sales personnel selling to a retail and/or wholesale business; and combinations thereof. "Relevant audience" means the desired or target audience.

As used herein, a "premium" product includes any product having types of, amounts of, and/or quality of ingredients exceeding relevant applicable and/or minimum regulatory standards.

A first embodiment of the present invention is a method of demonstrating advantages and benefits of an animal care product comprising the steps of:

- a.) presenting a first demonstration aid wherein the first demonstration aid demonstrates a first feature or characteristic;
- b.) presenting a second demonstration aid wherein the second demonstration aid demonstrates a second feature or characteristic;
- c.) describing to an audience the first feature or characteristic;
- d.) describing to an audience the second feature or characteristic;
- e.) comparing the first and second feature or characteristic; and
- f.) describing the advantages and benefits of the animal care product.

Another embodiment of the present invention is a system for demonstrating advantages and benefits of an animal care product comprising:

- a.) a first demonstration aid wherein the first demonstration aid demonstrates a first feature or characteristic;
- b.) a second demonstration aid wherein the second demonstration aid demonstrates a second feature or characteristic; and
- c.) an optional visual aid.

The methods and systems of the present invention can also include instructions for practicing and/or executing the methods and using the systems, i.e. for performing the demonstration and comparison methods and/or using the demonstration systems.

Non-limiting examples of a first feature or characteristic can include characteristics of an animal and/or human, characteristics of a product, and combinations thereof. Non-limiting examples of characteristics of an animal and/or human can include appearance, amount, and texture of coat of fur of an animal and/or hair of a human; appearance and texture of the skin of an animal and/or human; color, consistency, and amount of waste of an animal and/or human.

Non-limiting examples of a second feature or characteristic can include characteristics of an animal and/or human, characteristics of a product, and combinations thereof. Non-limiting examples of characteristics of an animal and/or human can include appearance, amount, and texture of coat of fur of an animal and/or hair of a human; appearance and texture of the skin of an animal and/or human; color, consistency, and amount of waste of an animal and/or human.

Non-limiting examples of first and second demonstration aids usable with the various embodiments of the present invention include posters; photographs; touchable devices; substances; containers of material; electronic presentation devices such as computers and screens; combinations thereof; and the like.

Non-limiting examples of visual aids usable with the various embodiments of the present invention include posters; photographs; electronic presentation devices such as computers and screens; labels; combinations thereof; and the like.

EXAMPLES

The following examples further describe and demonstrate particular embodiments within the scope of the present invention. The examples are given solely for the purpose of illustration and are not to be construed as limitations of the present invention, as one of skill in the art will recognize that many variations thereof are possible without departing from the spirit and scope of the invention. Any exemplified concentrations are weight-weight percents, unless otherwise specified.

Example 1

Hairball Demonstration Method and System

It is desirable to educate the relevant audience(s) regarding the advantages and benefits of premium animal care products, such as pet foods, versus standard such animal care products. However, many such advantages and benefits can be difficult to explain, demonstrate, or see initially or over time. For example, it can be difficult for one to imagine exactly what a particular amount, weight, or volume of hair or fur might look like. Therefore, the methods and systems of the present invention provide easily visualizable and understandable means for demonstrating such advantages and benefits and comparing animal care products.

In a method and system for demonstrating hair ingestion and hairball formation related benefits of a product, it is described to an audience that a cat spends approximately 30% of the time it is awake grooming itself, and that during such grooming small amounts of hair or fur are swallowed. It is described that on average, a cat swallows from about 4 to about 10, and more particularly, from about 6.4 to about 7.4 ounces of hair or fur annually. It is further described that only a small portion of the amount of hair or fur swallowed passes naturally through the animal's system, the rest being accumulated in the animal's stomach, forming ball-like masses which must be expelled by coughing and/or vomiting, both of which cause the animal to lose valuable electrolytes essential to good health, and which cause the human caretaker to have to clean up an unpleasant mess.

Finally, it is described that to help control hairball formation and development, new premium cat foods have been developed. The importance of diet, particularly a premium diet, in the control of hairball formation is emphasized and easily understood using an embodiment of the methods and systems of the present invention.

A method of demonstrating an amount of hair typically swallowed by a cat during a predetermined time period includes the steps of: presenting to an audience a first demonstration aid that can be visual and/or tangible, such as a container, preferably which is transparent and filled with a predetermined quantity of material such as hair or fur, or an equivalent visualizable substitute such as string or yarn; and demonstrating to the audience a first feature or characteristic, the first feature or characteristic being the predetermined quantity of material which can be an amount of hair or fur. The amount, weight, or mass of the predetermined quantity of material is described and shown, and can be further described using a visual aid such as a label affixable to and/or associated with the first demonstration aid. Non-limiting examples of transparent containers include: reclosable, reusable and/or disposable plastic containers, plastic bags, glass containers, and combinations thereof. Non-limiting examples of materials from which, and/or on which, a label can be formed include paper, plastics, wood, metal, and glass. A label can also be printed directly on the demonstration aid.

The present embodiment also includes a method and system of demonstrating that feeding a premium pet food can reduce hair ingestion and hairball formation versus a standard pet food. Such a method includes the steps of: presenting to an audience, in addition to the first demonstration aid, a second demonstration aid that can be a second transparent container filled with a second predetermined quantity of material illustrating a second feature or characteristic such as a second amount of hair or fur, wherein the second predetermined quantity of material is less than the predetermined quantity of material, from about 20% to about 70% less, alternatively from about 30% to about 60% less, alternatively from about 40% to about 50% less, and alternatively about 40% less (by weight or volume); and comparing the predetermined quantity of material with the second predetermined quantity of material, indicating that the second predetermined quantity of material represents, and/or illustrates a reduced amount of hair ingested, due to feeding an animal the premium pet food. Thus, the advantages and benefits of the premium pet food can be demonstrated and compared to a standard pet food. The second demonstration aid can also have a visual aid such as a label affixable to and/or associated therewith. Non-limiting examples of the second quantity of material include hair, fur, string, yarn, and mixtures thereof. Non-limiting examples of transparent containers include: reclosable, reusable and/or disposable plastic containers, plastic bags, glass containers, and combinations thereof. Non-limiting examples of materials from which, and/or on which, a label can be formed include paper, plastics, wood, metal, and glass. A label can also be printed directly on the demonstration aid.

FIG. 1A illustrates an embodiment of the present invention having a demonstration aid 10 containing a predetermined quantity of material 12. Demonstration aid 10 is a transparent container. A visual aid such as a label 14 can be affixable to demonstration aid 10, indicating, for example, an amount, weight, and/or type of material in the demonstration aid 10. Such a demonstration aid can be used in a method and system to illustrate and explain the amount of hair or fur ingested by an animal in a given time period, for example, a year.

Figure 1B:
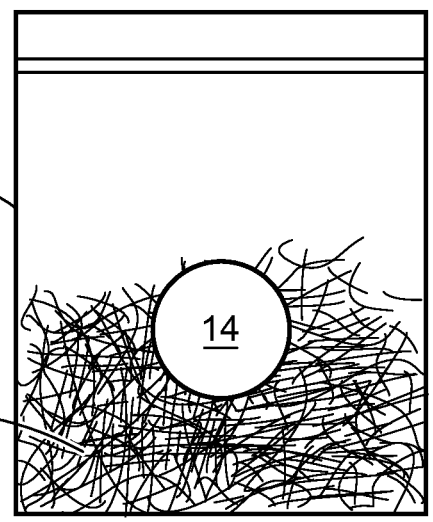
FIG. 1B is a front view of a demonstration aid for use in a method and system for comparing hair ingestion.

FIG. 1B illustrates a demonstration aid 16, a second transparent container, containing a second predetermined quantity of material 18, which second predetermined quantity of material 18 is less than predetermined quantity of material 12. A visual aid such as a label 14 can be affixable to second demonstration aid 16 to indicate, for example, an amount, weight, and/or type of material in second demonstration aid 16. The demonstration aids 10 and 16 can then be compared to demonstrate the advantages and benefits of a premium pet food in reduction of hair ingestion and reduction in resulting hair ball formation, coughing, vomiting, and unpleasant clean up.

Example 2

Skin/Coat Demonstration Method and System

It can also be difficult for one to imagine exactly what various animals' skin, fur, coat or hair might look and feel like based on eating different foods. Therefore, the methods and systems of the present invention provide easily visualizable and understandable methods and systems for comparing products and demonstrating advantages and benefits of premium versus standard foods with respect to an animal's skin, fur, coat and/or hair.

In a method and system for demonstrating and comparing skin, coat and overall health related benefits of a product, it is explained to an audience that the skin is the largest and one of the most important organs of the body, and because it is so visible, is also one of the best indicators of overall physical condition. It is explained that because fur and hair originates in the skin, its condition parallels and/or indicates the condition of the skin, and accordingly, the animal's or human's overall physical condition. It is explained that it is therefore important that animals and humans receive the most nutritious diet available in order to assure proper and optimum skin, hair, fur, and/or coat condition. The nutritional value of a diet can be evaluated because healthy skin, hair, fur, and coat will shine and feel soft and supple to the touch.

However, improvements in skin, hair, fur, and/or coat condition can be difficult to see, particularly if changes occur over a period of time. It is explained that to provide the best skin, hair, fur and/or coat condition, new premium foods have been developed. The importance of diet to healthy skin, hair, fur, and coat is emphasized and easily understood using the methods and systems of the present invention. In addition, the differences in skin, hair, fur and coat when using a premium food versus standard food can be easily demonstrated, compared, and understood for better understanding of the advantages and benefits of a premium food.

An embodiment of the present invention is a method of demonstrating how a premium pet food can provide better skin, hair, fur, and coat versus a standard pet food comprising the steps of: presenting to an audience a first demonstration aid that can be visual and/or tangible and has a texture, on an exterior surface, that is generally rough; contacting an area of skin of a member of the audience with the exterior surface of the first demonstration aid; presenting to the audience a second demonstration aid that can be visual and/or tangible and has a texture, on an exterior surface, that is smoother and softer than the texture of the exterior surface of the first demonstration aid; contacting an area of skin of the member of the audience with the exterior surface of the second demonstration aid; comparing the first demonstration aid with the second demonstration aid, and indicating that the second demonstration aid represents a better skin, hair, fur, and coat condition, due to feeding an animal a premium pet food, versus a different and/or standard food as represented by the first demonstration aid.

The present embodiment can also include one or more optional visual aids, such as presenting and discussing one or more pairs of photographs, the pairs of photographs depicting contrasting skin, hair, fur, and coat conditions, non-limiting examples of which include photographs of an animal before and after being fed premium food, and/or photographs of animals that were fed premium vs. non-premium food. For example, two photographs can be presented. One photograph would show a picture of an animal fed non-premium food, and would be labeled accordingly. The second photograph would show the same animal, at a later time period, after being fed premium food for a period of time, for example, three months, and would be labeled accordingly.

Figures 2A, 2B:
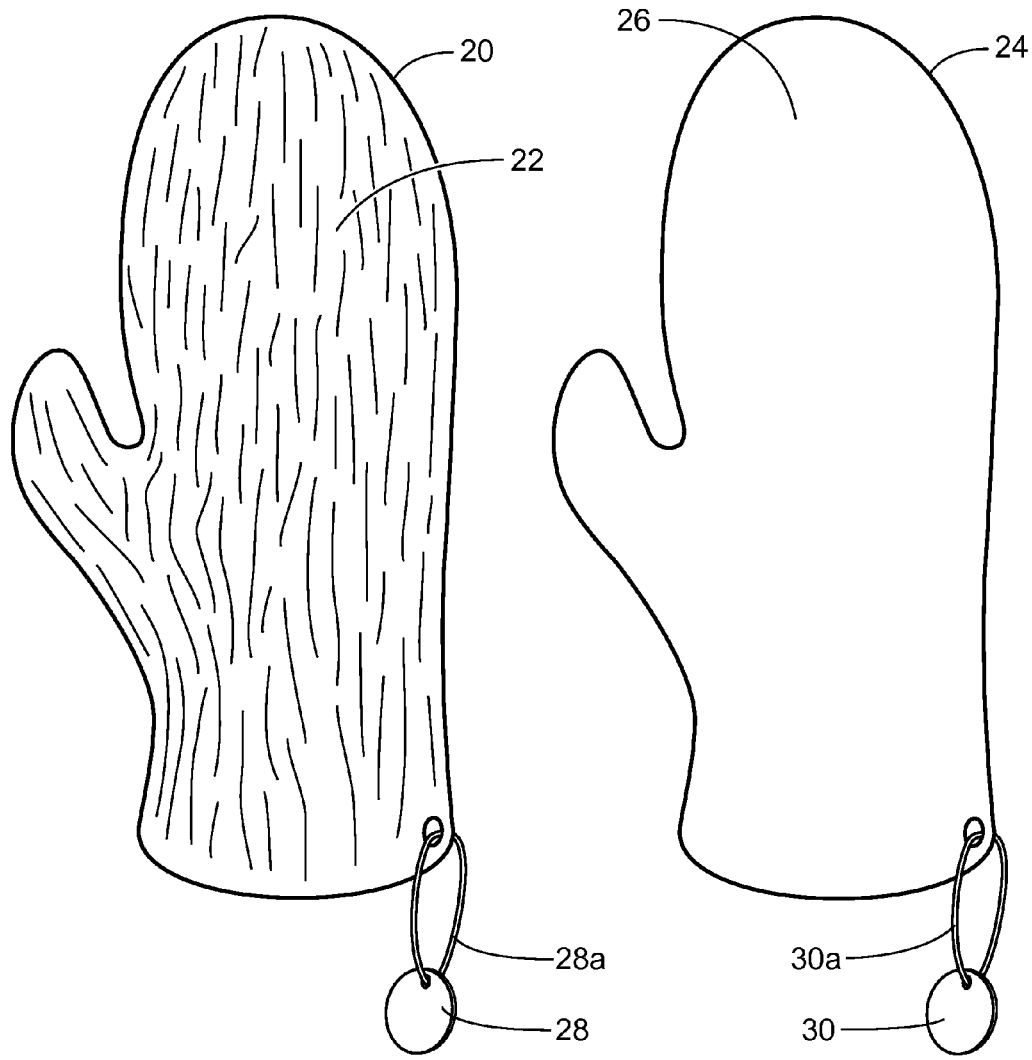
FIG. 2A is a front view of a first demonstration aid for use in a method and system for demonstrating premium pet food advantages and benefits to skin and coat of an animal.
FIG. 2B is a front view of a second demonstration aid for use in a method and system for demonstrating premium pet food advantages and benefits to skin and coat of an animal.

FIG. 2A illustrates a first demonstration aid 20, which can be formed in a variety of shapes, non-limiting examples of which include: glove, mitt, mitten, and sheet. Demonstration aid 20 can be formed from a variety of materials having a generally rough texture on exterior surface 22. Non-limiting examples of such materials include woven materials, non-woven materials, natural materials, synthetic materials, and combinations thereof, for example, burlap. Such a demonstration aid 20 can be used in a method and system to illustrate what an animal coat in poor condition would feel like. Also included in this embodiment, and shown in FIG. 2B, is a second demonstration aid 24, which can also be formed in a variety of shapes, non-limiting examples of which include: glove, mitt, mitten, and sheet. Second demonstration aid 24 can be formed from a variety of materials having a generally smooth, soft exterior surface 26. Non-limiting examples of such materials include woven materials, non-woven materials, natural materials, synthetic materials, and combinations thereof, for example, velvet, velour, corduroy, and fleece.

Both first and second demonstration aids 20, 24 respectively can have visual aids associated therewith, such as a label affixable thereto, shown as labels 28 and 30 respectively. Labels 28, 30 can be made from a variety of materials, non-limiting examples of which include: plastic, nylon, wood, paper, cardboard, glass, metal and the like. Alternatively, labels can be printed directly on the demonstration aid. Such a label 28, 30 can provide information useful to aid in identifying and comparing differences in an animal's coat as represented by first and second demonstration aids 20, 24 respectively. Labels 28, 30 can be affixed to first and second demonstration aids 20, 24 by a cord or string 28a, 30a respectively. Alternatively such labels can be affixed by sewing or adhesive. In addition, other visual aids such as one or more photographs of one or more animals can be used to show and compare various skin and coat conditions. Such visual aids can be presented in hard copy or can be electronically presented, for example on a television or computer monitor type screen.

Example 3

Food Waste Demonstration Method and System

It can be particularly difficult for one to imagine exactly how a food can affect an animal's nutrition and production of waste (i.e. stool, feces, excrement), particularly for example with respect to quantity of waste produced. The methods and systems of the present invention provide easily visualizable and understandable means for demonstrating and comparing advantages and benefits of premium versus standard pet foods with respect to an animal's nutrition and waste production.

In a method and system for demonstrating effects of food on nutrition and waste production, particularly with respect to amount of food retained and used by an animal and amount of waste produced by an animal, it is explained to an audience that pet food producers have developed premium products which provide greater nutrition than do standard products of equal volume. For example, it can be explained that it has been shown that an animal given three cups of premium food produces about one half cup of waste, whereas the same animal given three cups of standard food produces about one and one half cups of waste. Therefore, it can be explained and easily understood that more of the premium food is retained, absorbed, and used by the animal, and that therefore the animal fed premium food will gain greater nutritional value from consumption of premium food versus consumption of standard food.

An embodiment of the method and system of the present invention for demonstrating and comparing how a premium pet food can provide greater and/or better digestion of food, greater retention of nutrients, and less waste production versus a different or standard pet food, comprises the steps of: presenting to an audience a first demonstration aid that can be visual and/or tangible, into which a quantity of a first pet food is depositable and from which a portion of the first pet food is recoverable; presenting to an audience a second demonstration aid that can be visual and/or tangible, into which a same quantity of a second pet food is depositable and from which a portion of the same quantity of second pet food is recoverable; depositing a quantity of the first pet food into the first demonstration aid; depositing the same quantity of the second pet food into the second demonstration aid; recovering a portion of the quantity of the first pet food from the first demonstration aid; recovering a portion of the same quantity of the second pet food from the second demonstration aid; wherein the portion of the same quantity of the second pet food recovered is less than the portion of the quantity of the first pet food recovered; and explaining to the audience that the portion of the same quantity of the second pet food recovered represents a premium pet food that produces less waste than a non-premium pet food, thus resulting in a pet fed the premium pet food retaining more of the premium pet food for the pet's nutrition, while reducing production of waste which must be disposed of. Thus, the amount of waste produced per unit amount of premium pet food ingested is less than the amount of waste produced per unit amount of standard pet food ingested.

Although the example herein relates to pet foods, such a method and system can be used to compare and/or contrast any food product, the amount of absorption of which, and the amount of waste produced therefrom, represents the product's usefulness, nutritional value, and/or benefit.

Figure 3:
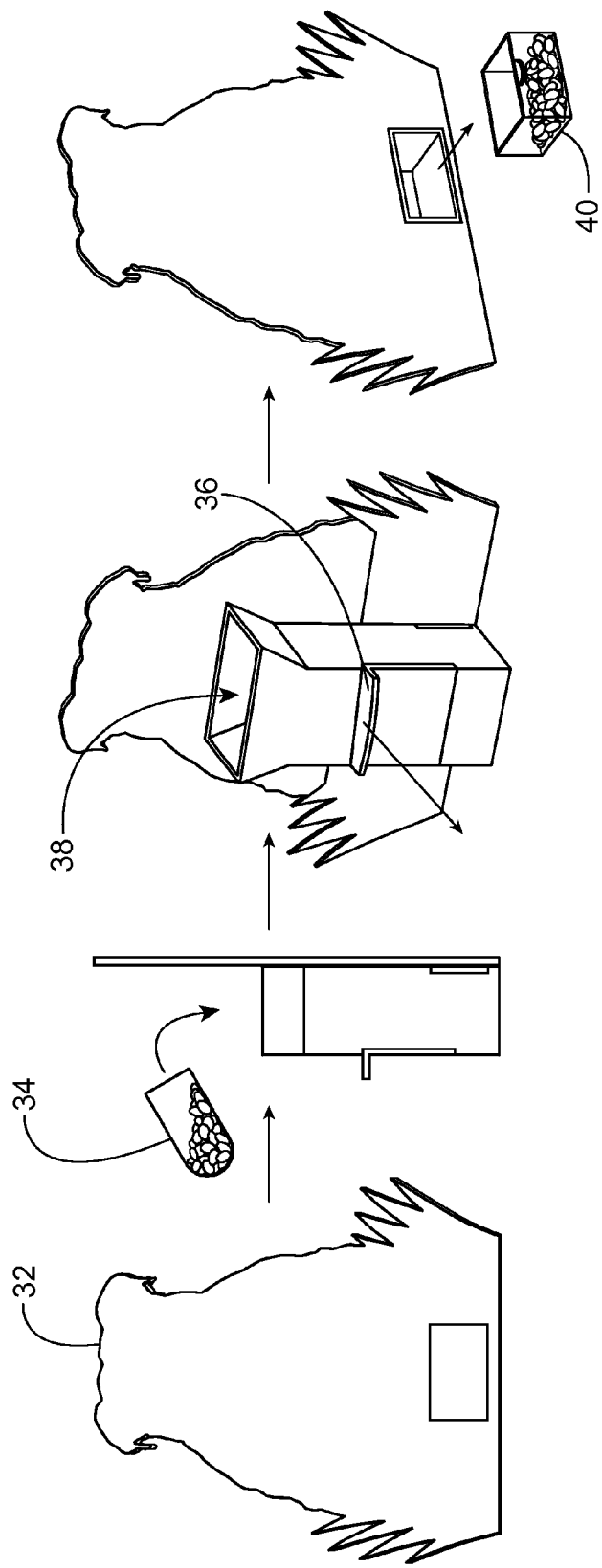
FIG. 3 is a schematic representation of a system for use with a method of demonstrating digestion and nutrition benefits and waste production reduction when using a premium pet food.

FIG. 3 schematically illustrates a portion of a system for demonstrating and comparing, via amount of food ingested vs. amount of waste produced, advantages and benefits of a premium pet food vs. a standard pet food. FIG. 3 summarizes the steps for using each of first and second demonstration aids, the steps comprising: presenting a demonstration aid 32; depositing an amount of material 34, such as pet food, into the demonstration aid 32; pulling a lever or protrusion 36 at the rear of the device such that a portion of the material 34 falls into a lower tray or drawer 40; and removing the lower tray or drawer 40 through the front of the device to demonstrate amount of waste produced. Two such demonstration aids can be used together in a method of the invention. Each demonstration aid can be constructed to deposit a different amount of food into the drawer 40. Thus, multiple devices can be used to demonstrate, via a side-by-side comparison, the amount of waste produced from ingestion of different foods.

In summary, FIGS. 4A-D and FIGS. 5A-D illustrate a pair of fillable demonstration aids usable in an embodiment of the methods and systems of the present invention. Each aid delivers a different amount of material representing food ingested and waste produced. The structure and operation of the demonstration aids is described in detail below.

Such an embodiment includes a first demonstration aid that can depict an animal on a front facing which can have graphics thereon, and a second demonstration aid that can depict the same animal on a front facing. The two demonstration aids appear visually identical from the front, however each has a different interior structure such that each meters through a different amount of a given material deposited into the demonstration aid. For example, if three cups of standard pet food are deposited into an embodiment of a first demonstration aid, illustrated in FIGS. 4A-D, per the method illustrated in FIG. 3, in one embodiment about one and one half cups of pet food are delivered through and are recoverable from the first demonstration aid. However, when three cups of pet food are deposited in an embodiment of a second demonstration aid, as illustrated in FIGS. 5A-D, per the method illustrated in FIG. 3, only one half cup of material is delivered through and is recoverable from the second demonstration aid. Thus, a visually discernable difference in amount of food ingested versus amount of waste produced can be demonstrated using two such aids.

Each demonstration aid can be made from a variety of materials. The physical structure of the demonstration aids is relatively simple. All parts of each demonstration aid can, if desired, be made from the same material, or different materials. Non-limiting examples of materials from which the demonstration aids can be made include: wood, fiber board, cardboard, poster board, foam, plastic, fiberglass, metal, glass, and combinations thereof. The depiction of an animal on the front facing can be formed in a variety of ways, non-limiting examples of which include: drawing and/or painting in pencil, ink, paint; computer generated printout, photographic image, screen printing, and combinations thereof. The demonstration aids can also be provided with instructions for using the aids in the methods of the invention.

Figure 4A:
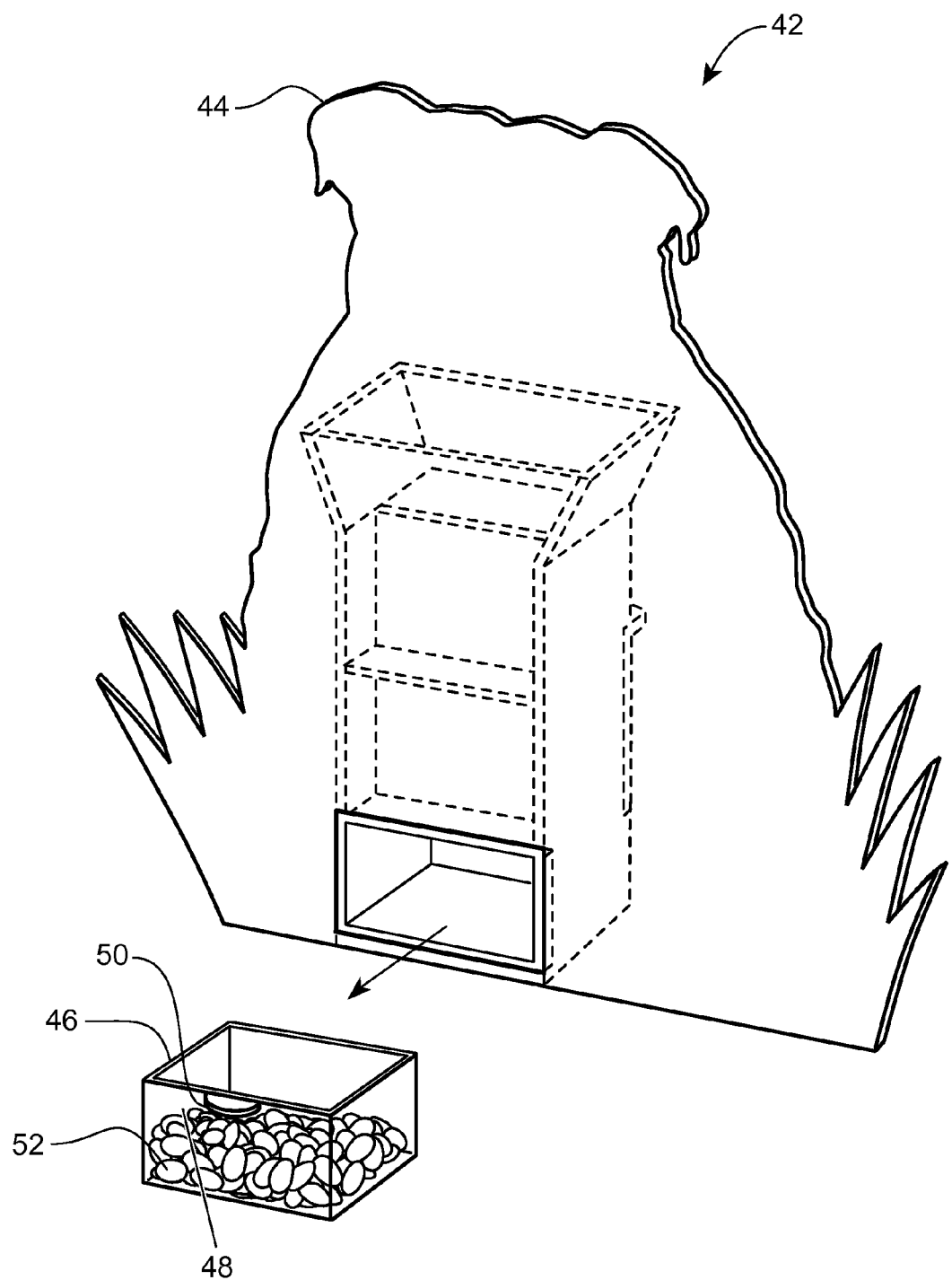
FIG. 4A is a partially exploded view of a front of a first demonstration aid for use in a method and system for demonstrating digestion and nutrition benefits and waste production reduction when using a premium pet food.

More particularly, FIG. 4A illustrates the front of a first demonstration aid 42. Aid 42 can include front facing 44 which can be formed in the shape of an animal, for example a dog sitting in grass. Front facing 44 can have a graphic illustration of the front of the dog depicted thereon (as shown in FIG. 3), showing eyes, mouth etc. Although embodiments of the demonstration aids are shown herein as having a front facing, such a facing is not required in order to demonstrate the effect of premium food in nutrient retention and waste reduction. However, having such a front facing aids in visualization and comprehension of the methods and results.

A drawer 46 is insertable and removable through front facing 44. Drawer 46 can be completely or partially removable. Drawer 46 can include a detail such as an outwardly extending rib, protrusion, tab, or handle 50 which can be gripped for insertion and removal of drawer 46. Drawer 46 can contain a material such as for example pet food 52. Drawer 46 includes a front surface 48 that can remain flush with front facing 44 when drawer 46 is fully closed.

Figure 4B:
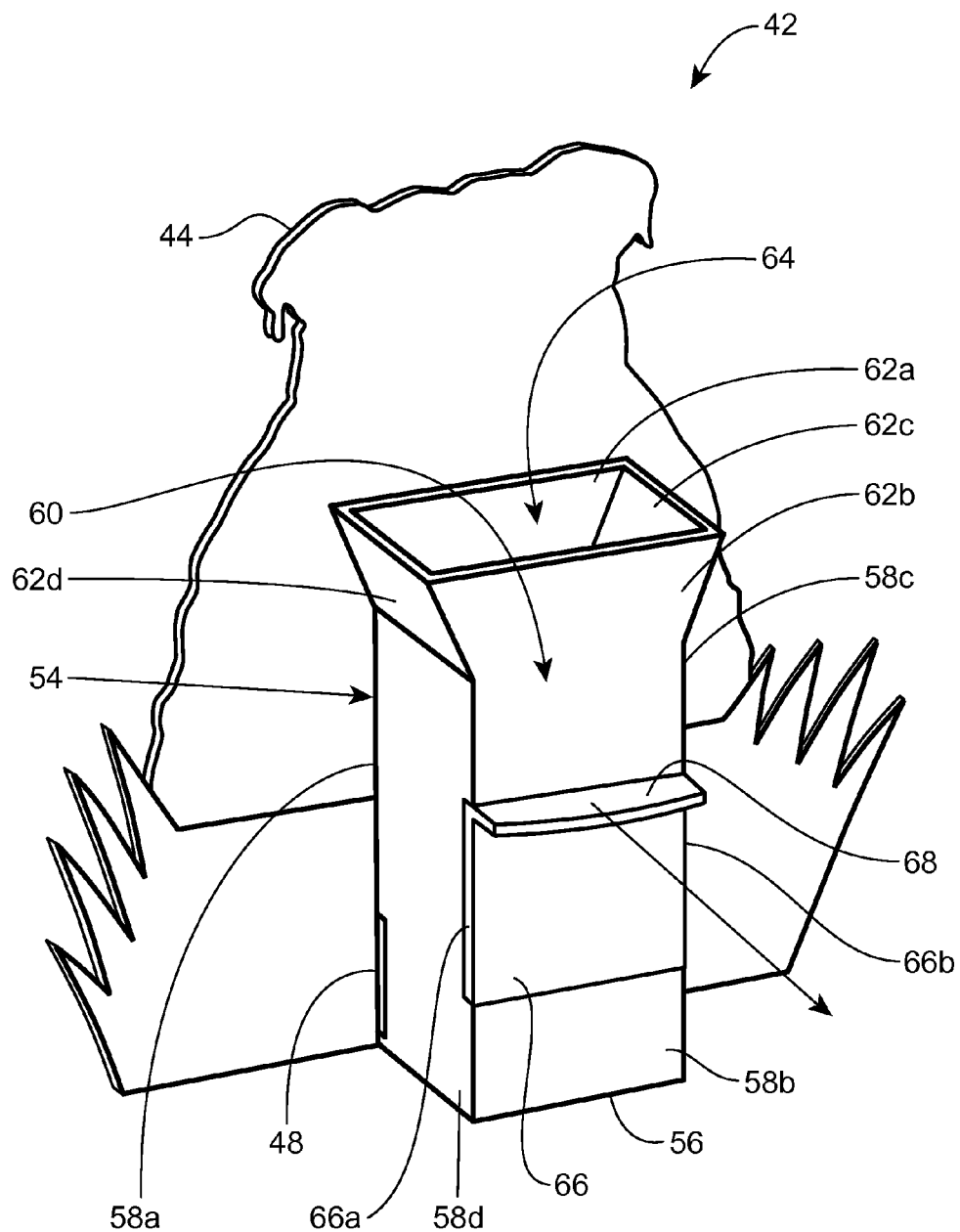
FIG. 4B is a perspective view of a rear of a first demonstration aid for use in a method and system for demonstrating digestion and nutrition benefits and waste production reduction when using a premium pet food.

FIG. 4B illustrates the rear of first demonstration aid 42. Attachable to front facing 44 is an upright structure 54. Upright structure 54 has a bottom 56 and four surfaces 58a-d, front, rear, left and right side respectively, and an upward open end 60. Upright structure 54 encloses a volume sufficient to contain a pre-determined amount of material such as for example pet food 52 shown in FIG. 4A.

Upright structure 54 includes four extended portions 62a-d extending upwardly respectively from each side surface 58a-d. Two or more of extended portions 62a-d can be biased outwardly away from a vertical axis of upright structure 54 to form a collection hopper 64 into which a material can be deposited. As shown in FIG. 4A, side extended portions 62c and 62d are biased outwardly to form collection hopper 64.

FIG. 4B also shows a face of a second drawer 66 which can optionally be included. Drawer 66 can be located above drawer 46 and opens to the rear of demonstration aid 42. Drawer 66 can be gripped at its side edges 66a, 66b for sliding drawer 66 into and out of upright structure 54. Second drawer 66 can be included to catch and contain material that is not deposited into drawer 46.

Also shown in FIG. 4B is a detail such as an outwardly extending rib, protrusion, tab, or handle 68 which connects to a slidable horizontal partition that is described below. Handle 68 can be gripped for sliding the horizontal partition as described below.

Figure 4C:
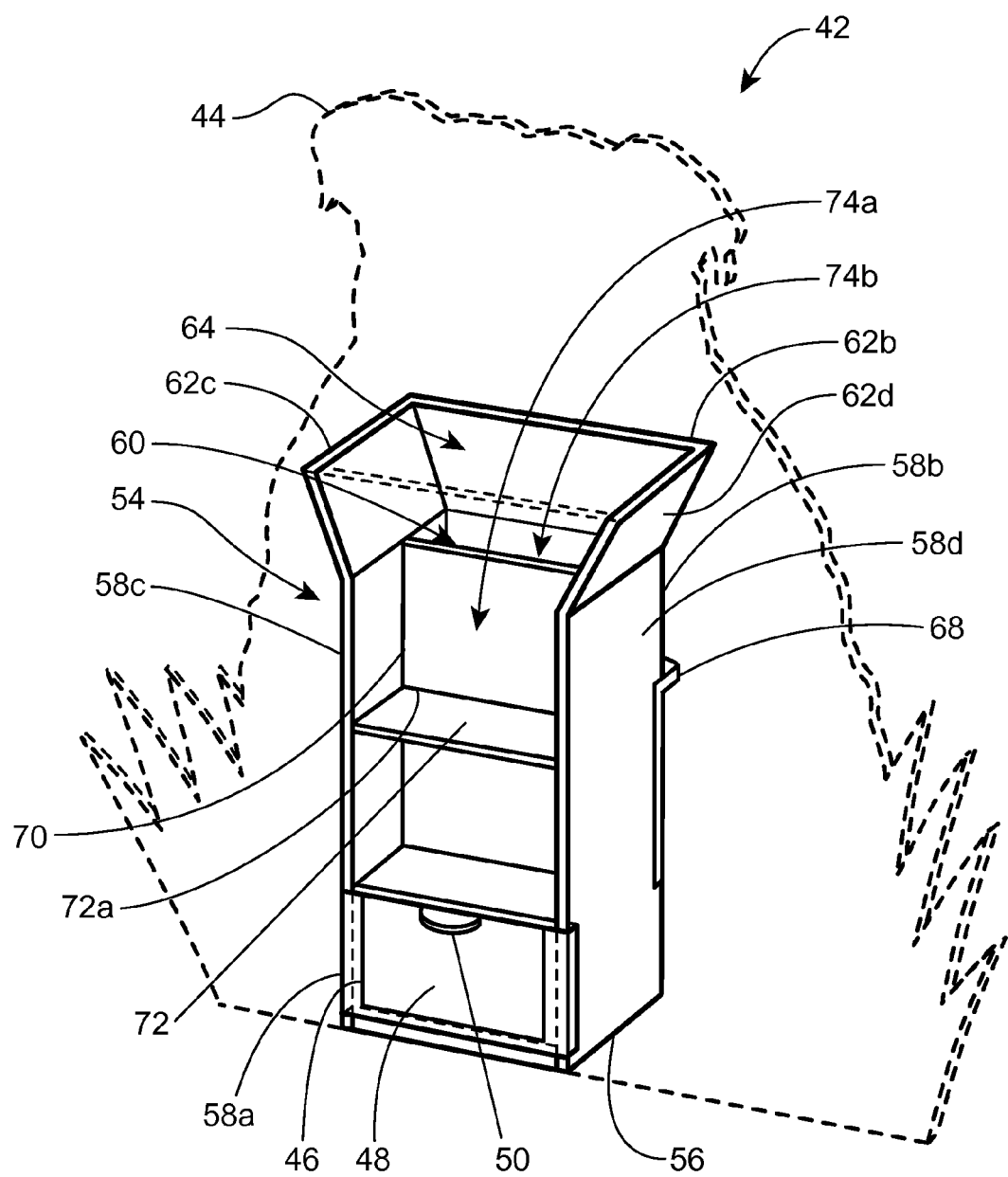
FIG. 4C is a cut away view of a first demonstration aid for use in a method and system for demonstrating digestion and nutrition benefits and waste production reduction when using a premium pet food.

FIG. 4C is a cut away view showing the inside of upright structure 54. A downwardly extending vertical partition 70 is disposed within upright structure 54. Partition 70 extends between a lower portion of hopper 64 and a plane that lies immediately above and parallel to an open, uppermost portion of drawer 46 if second drawer 66 is not used. If a second drawer 66 is included, downwardly extending vertical partition 70 terminates at a plane that lies immediately above and parallel to a horizontal partition 72 described further below. The position of vertical partition 70 within upright structure 54 defines two compartments 74a, 74b that can be of equal or unequal size. Compartments 74a, 74b can be oriented, as shown, as front 74a and rear 74b compartments. Drawer 46 extends from the front surface 58a, is adjacent and/or contiguous to the inside surfaces of side surfaces 58c, 58d of upright structure 54 and terminates below and adjacent to vertical partition 70, thus extending under front compartment 74a and providing a means for catching and containing the material deposited into compartment 74a. Second drawer 66, if used, is openable to the rear of demonstration aid 42, and terminates below and adjacent to vertical partition 70, thus extending under rear compartment 74b and providing a means for catching and containing material deposited into compartment 74b.

In this particular illustration of first demonstration aid 42, compartments 74a, 74b are of equal size. In an embodiment where compartments 74a, 74b are not of equal size, the smaller of the two compartments 74a can be located adjacent front side surface 58a, through which drawer 46 passes.

Upright structure 54 also has a horizontal partition 72 disposed within upright structure 54 and extending through rear side surface 58b of upright structure 54, which rear side surface 58b lies adjacent to the rear and larger compartment 74b if one compartment is larger than the other. Horizontal partition 72 can be disposed approximately at a midpoint of a height of upright structure 54. Horizontal partition 72 extends through rear side surface 58b and is adjacent to and/or contiguous with the inside surfaces of each of side surfaces 58a-d, thus effectively providing a floor or means of catching and containing any material deposited into collection hopper 64. Horizontal partition 72 is slidable frontwardly and rearwardly through rear side surface 58b such that rearward sliding of horizontal partition can release the contents of one or both of compartments 74a, 74b as desired. When horizontal partition 72 is slid rearwardly out of compartment 74a, the contents of compartment 74a drop into drawer 46. When horizontal partition is slid rearwardly out of compartment 74b, the contents of compartment 74b drop either to the bottom surface 56 of upright structure 54 or into second drawer 66 if second drawer 66 is used.

Horizontal partition 72 can include handle 68 for gripping, sliding and manipulating horizontal partition 72. For ease of visualization handle 68 is not shown in FIG. 4C.

Horizontal partition 72 can also include a stop mechanism 72a to prevent complete and/or accidental removal of horizontal partition 72 from upright structure 54. A non-limiting example of such a stop mechanism can be a protrusion extending upwardly away from a top surface of horizontal partition 72. Such a stop mechanism 72a can be configured so as to contact an inner surface of rear side surface 58b of upright structure 54 so as to prevent further travel of horizontal partition 72. Stop mechanism can also be configured so as to allow horizontal partition 72 to be completely removed from demonstration aid 42, by bypassing the stop mechanism if desired. In order remove horizontal partition 72 from upright structure 54, a clearance aperture (not shown) can be provided through rear side surface 58b. In order to remove the horizontal partition 72 from upright structure 54, or move horizontal partition 72 beyond vertical partition 70, a clearance aperture (not shown) can also be provided through vertical partition 70. Though particular embodiments of a clearance aperture are not illustrated in the Figures, one of skill in the art would understand from the description provided herein, how one could construct a variety of such stop mechanisms and clearance apertures.

When second drawer 66 is used, horizontal partition 72 can be disposed just above and parallel to an open top portion of second drawer 66. For ease of visualization of the interior of upright structure 54 second drawer 66 is not shown in FIG. 4C. However, if second drawer 66 is used, second drawer 66 extends through rear side surface 58b, is adjacent to and/or contiguous with the inside surfaces of left and right side surfaces 58c, 58d, and terminates adjacent to downwardly extending vertical partition 70, such that second drawer 66 forms a means for catching and containing the contents of rear compartment 74b when horizontal partition 72 is slid outwardly. Second drawer 66 pulls out to the rear of the demonstration aid, and can be partially or completely removable.

Figure 4D:
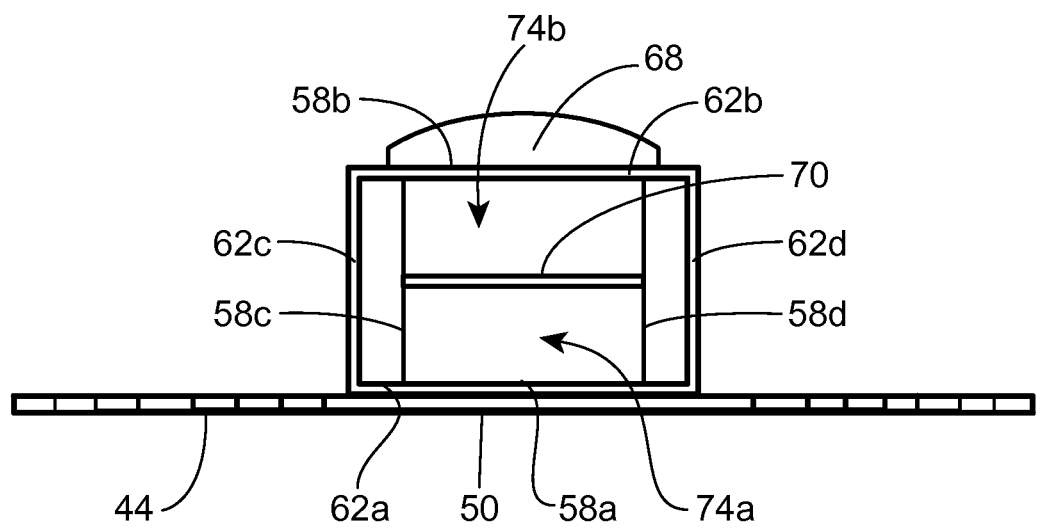
FIG. 4D is a top view of a portion of a first demonstration aid for use in a method and system for demonstrating digestion and nutrition benefits and waste production reduction when using a premium pet food.

FIG. 4D illustrates, from above, front facing 44, handle 50 of drawer 46, and the interior of upright structure 54 including side surfaces 58a-d, extended portions 62a-d, vertical partition 70, handle 68 of horizontal partition 72 and equally sized compartments 74a, 74b.

Figure 5A:
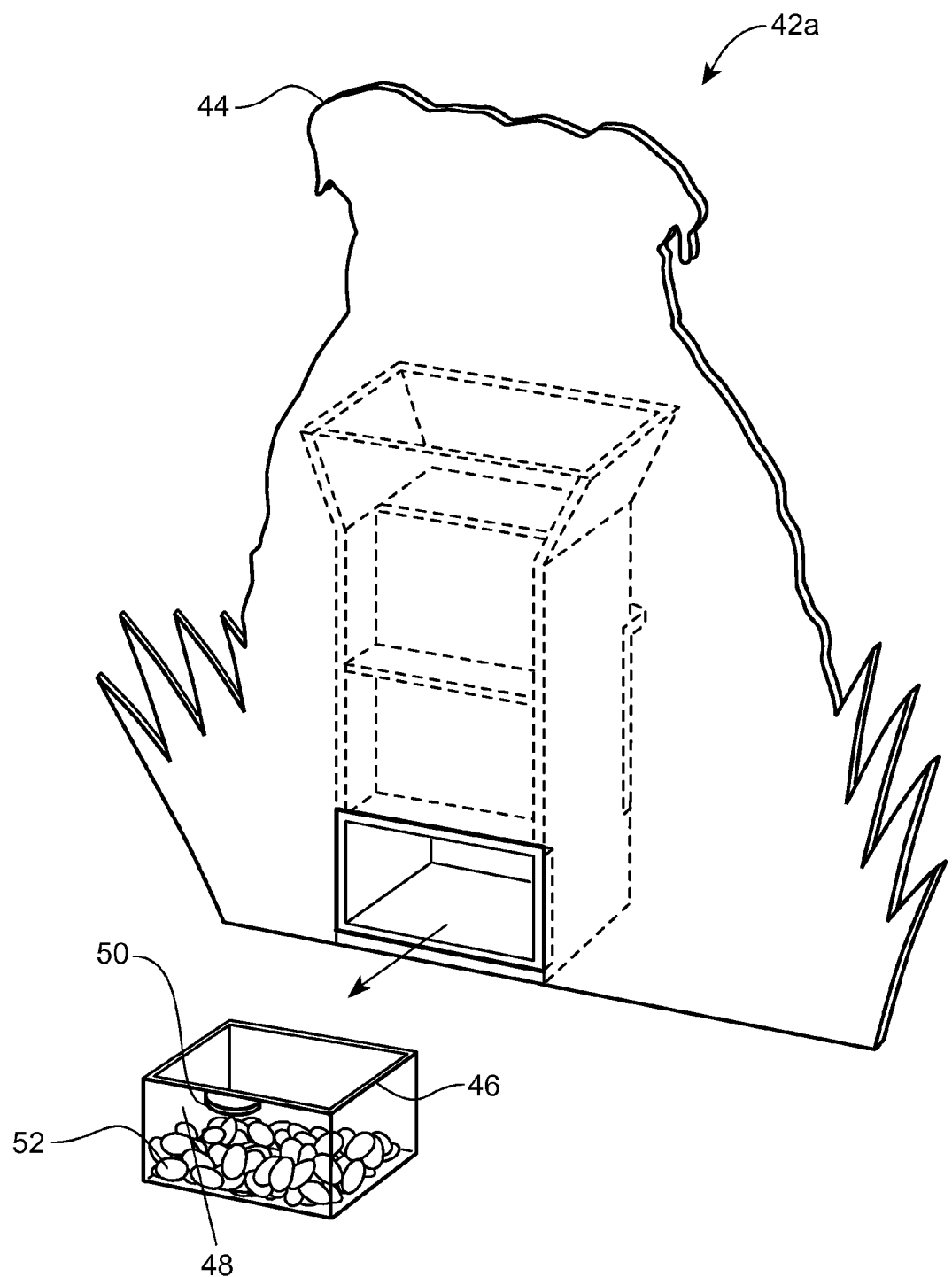
FIG. 5A is a partially exploded view of a front of a second demonstration aid for use in a method and system for demonstrating digestion and nutrition benefits and waste production reduction when using a premium pet food.

FIG. 5A illustrates the front of a second demonstration aid 42a. Aid 42a can include front facing 44 which can be formed in the shape of an animal, for example a dog sitting in grass and can be identical to the animal depicted on first demonstration aid 42. Front facing 44 can have a graphic illustration of the front of the dog depicted thereon (as shown in FIG. 3), showing eyes, mouth etc. Although embodiments of the demonstration aids are shown herein as having a front facing, such a facing is not required in order to demonstrate the effect of premium food in nutrient retention and waste reduction. However, having such a front facing aids in visualization and comprehension of the method and results.

A drawer 46 is insertable and removable through front facing 44. Drawer 46 can be completely or partially removable. Drawer 46 can include a detail such as an outwardly extending rib, protrusion, tab, or handle 50 which can be gripped for insertion and removal of drawer 46. Drawer 46 can contain a material such as for example pet food 52. Drawer 46 includes a front surface 48 that can remain flush with front facing 44 when drawer 46 is fully closed.

Figure 5B:
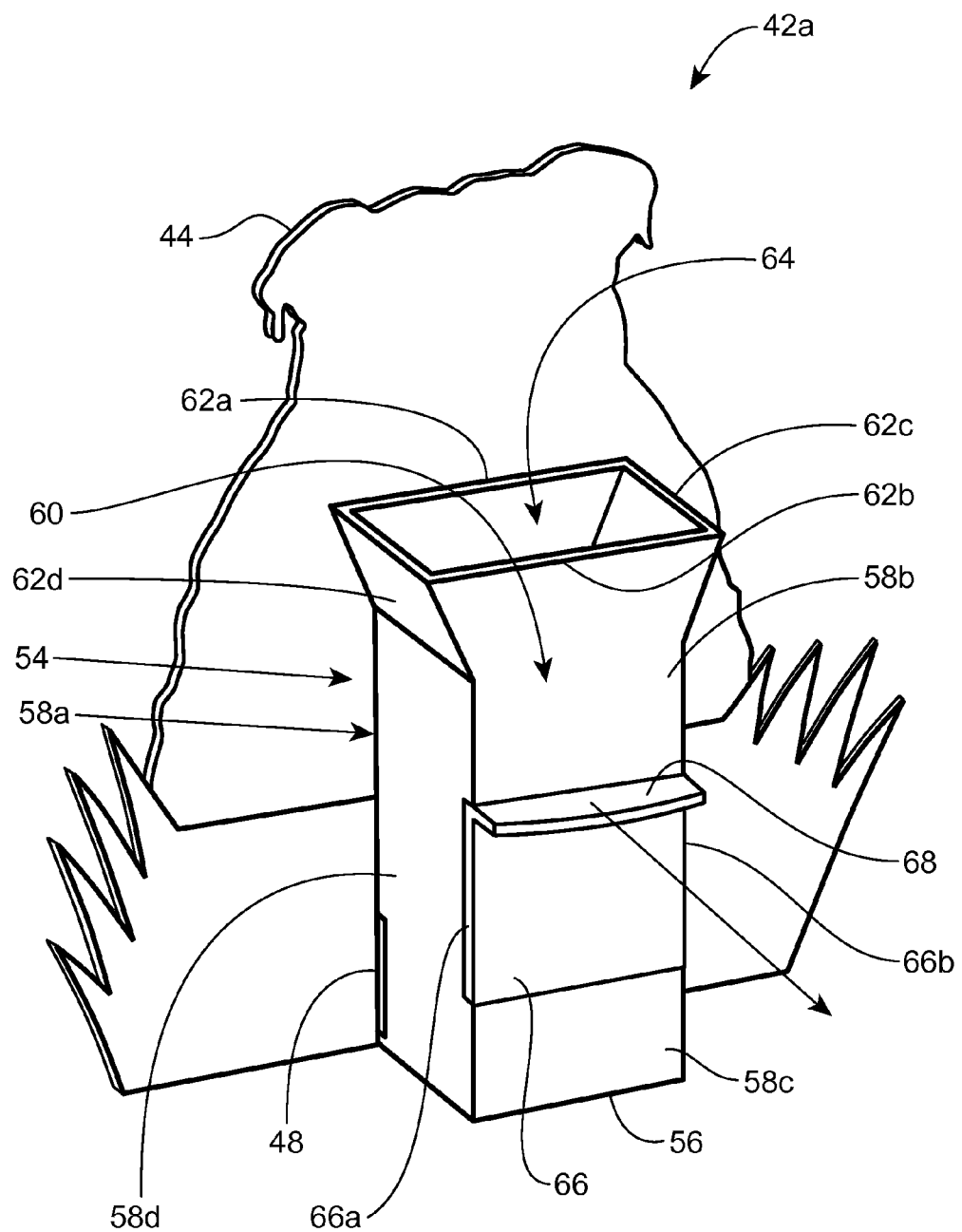
FIG. 5B is a perspective view of a rear of a second demonstration aid for use in a method and system for demonstrating digestion and nutrition benefits and waste production reduction when using a premium pet food.

FIG. 5B illustrates the rear of first demonstration aid 42a. Attachable to front facing 44 is an upright structure 54. Upright structure 54 has a bottom 56 and four surfaces 58a-d, front, rear, left and right sides respectively, and an upward open end 60. Upright structure 54 encloses a volume sufficient to contain a pre-determined amount of material such as for example pet food 52 shown in FIG. 5A.

Upright structure 54 includes four extended portions 62a-d extending upwardly respectively from each side surface 58a-d. Two or more of extended portions 62a-d can be biased outwardly away from a vertical axis of upright structure 54 to form a collection hopper 64 into which a material can be deposited. As shown in FIG. 4A, side extended portions 62c and 62d are biased outwardly to form collection hopper 64.

FIG. 5B also shows a face of a second drawer 66 which can optionally be included. Drawer 66 can be located above drawer 46 and opens to the rear of demonstration aid 42a. Drawer 66 can be gripped at its side edges 66a, 66b for sliding drawer 66 into and out of upright structure 54. Second drawer 66 can be included to catch and contain material that is not deposited into drawer 46.

Also shown in FIG. 5B is a detail such as an outwardly extending rib, protrusion, tab, or handle 68 which connects to a slidable horizontal partition that is described below. Handle 68 can be gripped for sliding the horizontal partition as described below.

Figure 5C:
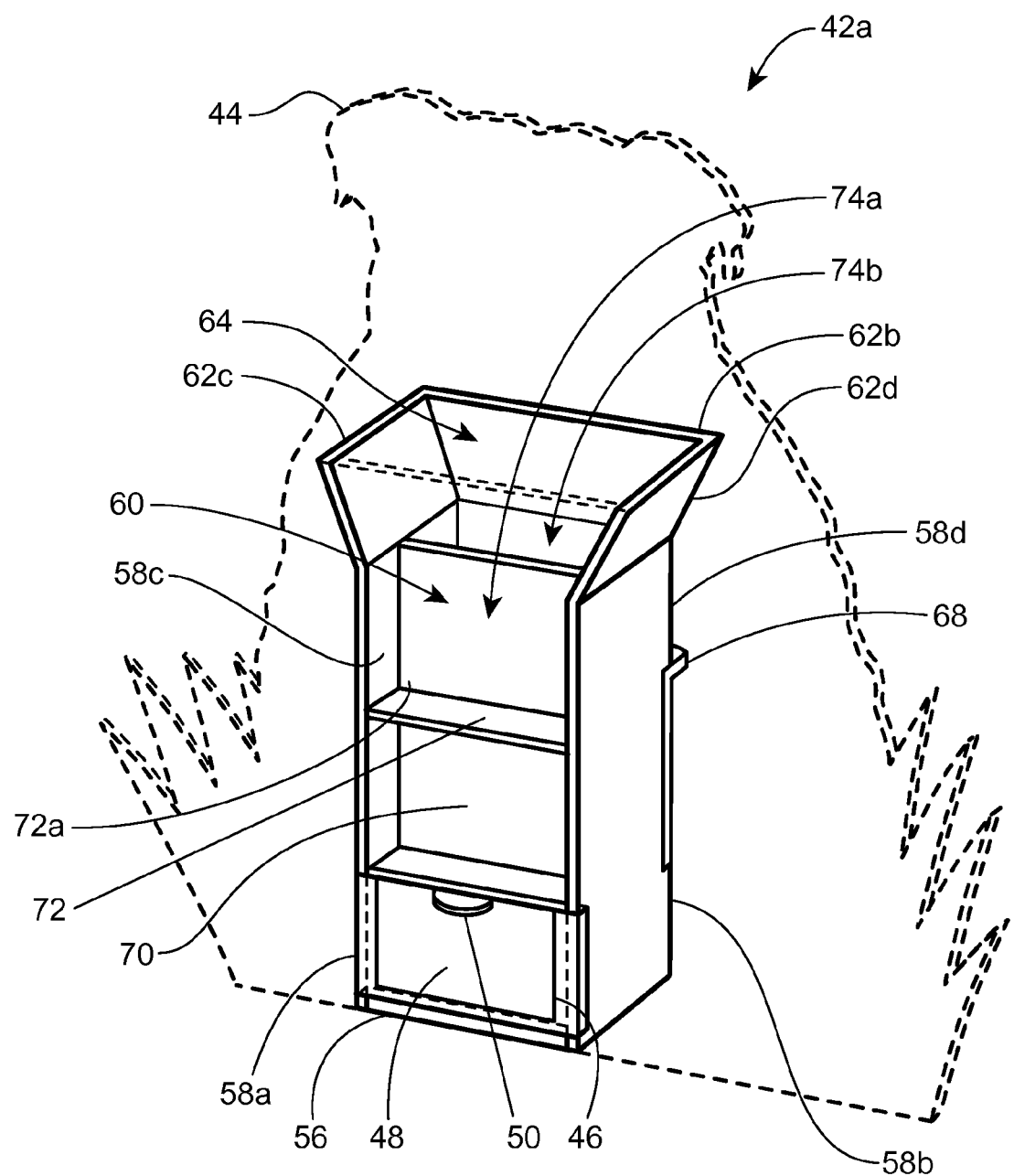
FIG. 5C is a cut away view of a second demonstration aid for use in a method and system for demonstrating digestion and nutrition benefits and waste production reduction when using a premium pet food.

FIG. 5C is a cut away view showing the inside of upright structure 54. A downwardly extending vertical partition 70 is disposed within upright structure 54. Partition 70 extends between a lower portion of hopper 64 and a plane that lies immediately above and parallel to an open, uppermost portion of drawer 46 if second drawer 66 is not used. If second drawer 66 is included, downwardly extending vertical partition 70 would terminate at a plane that lies immediately above and parallel to a horizontal partition 72 described further below. The position of vertical partition 70 within upright structure 54 defines two compartments 74a, 74b that can be of equal or unequal size. Compartments 74a, 74b can be oriented, as shown, as front 74a and rear 74b compartments. Drawer 46 extends from the front surface 58a, is adjacent and/or contiguous to the inside surfaces of side surfaces 58c, 58d of upright structure 54 and terminates below and adjacent to vertical partition 70, thus extending under front compartment 74a and providing a means for catching and containing the material deposited into compartment 74a. Second drawer 66, if used, is openable to the rear of demonstration aid 42a, and terminates below and adjacent to vertical partition 70, thus extending under rear compartment 74b and providing a means for catching and containing material deposited into compartment 74b.

In this particular illustration of second demonstration aid 42a, compartments 74a, 74b are of unequal size. Compartments 74a, 74b can be oriented, as shown, as front 74a and rear 74b compartments. In such an embodiment where compartments 74a, 74b are not of equal size, the smaller of the two compartments can be located adjacent front side surface 58a, through which drawer 46 passes.

When compartments 74a, 74b are not of equal size, the volume of the larger, rear compartment 74b is from about 2 to about 10 times greater than the volume of the smaller, front compartment 74a, alternatively from about 3 to about 7 times greater than the volume of the smaller, front compartment 74a, and alternatively about 5 times greater than the volume of the smaller, front compartment 74a. Thus, the amount or quantity of the second material, for example pet food, that is recoverable from the second fillable demonstration aid is from about 2 to about 10 times less, alternatively from about 3 to about 7 times less, and alternatively about 5 times less than the amount or quantity of the first material, for example, pet food, that is recoverable from the first fillable demonstration aid 42.

Upright structure 54 also has a horizontal partition 72 disposed within upright structure 54 and extending through rear side surface 58b of upright structure 54, which rear side surface 58b lies adjacent to the rear and larger compartment 74b. Horizontal partition 72 can be disposed approximately at a midpoint of a height of upright structure 54. Horizontal partition 72 extends through rear side surface 58b and is adjacent to and/or contiguous with the inside surfaces of each of side surfaces 58a-d, thus effectively providing a floor or means of catching and containing material deposited into collection hopper 64. Horizontal partition 72 is slidable frontwardly and rearwardly through rear side surface 58b such that rearward sliding of horizontal partition can release the contents of one or both of compartments 74a, 74b as desired. When horizontal partition 72 is slid rearwardly out of compartment 74a, the contents of compartment 74a drop into drawer 46. When horizontal partition is slid rearwardly out of compartment 74b, the contents of compartment 74b drop either to the bottom surface 56 of upright structure 54 or into second drawer 66 if second drawer 66 is used.

Horizontal partition 72 can include handle 68 for gripping, sliding and manipulating horizontal partition 72. For ease of visualization, handle 68 is not shown in FIG. 5C.

Horizontal partition 72 can also include a stop mechanism 72a to prevent complete and/or accidental removal of horizontal partition 72 from upright structure 54. A non-limiting example of such a stop mechanism can be a protrusion extending upwardly away from a top surface of horizontal partition 72. Such a stop mechanism 72a can be configured so as to contact an inner surface of rear side surface 58b of upright structure 54 so as to prevent further travel of horizontal partition 72. Stop mechanism can also be configured so as to allow horizontal partition 72 to be completely removed from demonstration aid 42, by bypassing the stop mechanism if desired. In order remove horizontal partition 72 from upright structure 54, a clearance aperture (not shown) can be provided through rear side surface 58b. In order to remove the horizontal partition 72 from upright structure 54, or move horizontal partition 72 beyond vertical partition 70, a clearance aperture (not shown) can also be provided through vertical partition 70. Though particular embodiments of a clearance aperture are not illustrated in the Figures, one of skill in the art would understand from the description provided herein, how one could construct a variety of such stop mechanisms and clearance apertures.

When second drawer 66 is used, horizontal partition 72 can be disposed just above and parallel to an open top portion of second drawer 66. For ease of visualization of the interior of upright structure 54 second drawer 66 is not shown in FIG. 5C. However, if second drawer 66 is used, second drawer 66 extends through rear side surface 58b, is adjacent to and/or contiguous with the inside surface of left and right side surfaces 58c, 58d, and terminates adjacent downwardly extending vertical partition 70, such that second drawer 66 forms a floor or means for catching and containing the contents of rear compartment 74b when horizontal partition 72 is slid outwardly. Second drawer 66 pulls out to the rear of the demonstration aid, and can be partially or completely removable.

Figure 5D:
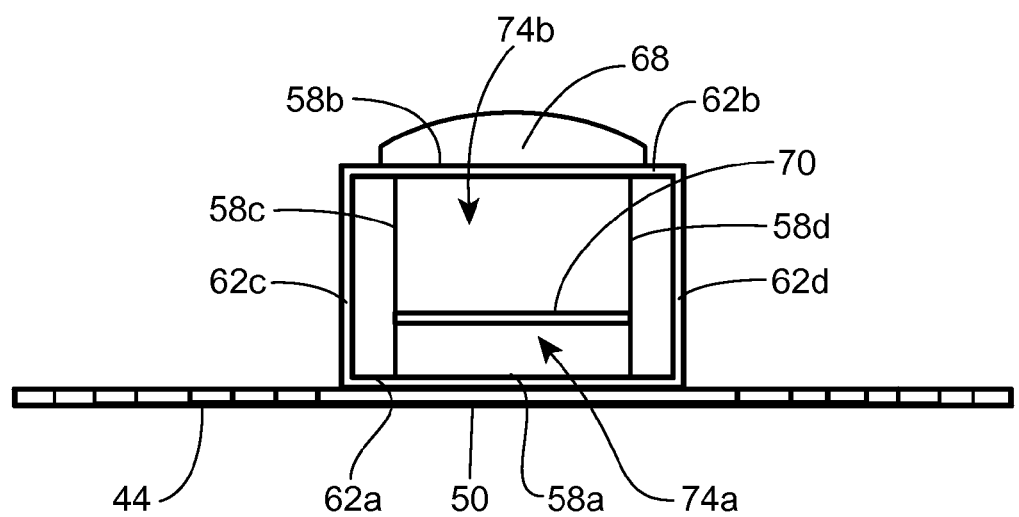
FIG. 5D is a top view of a portion of a second demonstration aid for use in a method and system for demonstrating digestion and nutrition benefits and waste production reduction when using a premium pet food.

FIG. 5D illustrates, from above, front facing 44, handle 50 of drawer 46, and the interior of upright structure 54 including side surfaces 58a-d, extended portions 62a-d, vertical partition 70, handle 68 of horizontal partition 72 and unequally sized compartments 74a, 74b.

Thus, the first and second demonstration aids 42, 42a shown in FIGS. 4A-D and 5A-D can be used together as a system in a method of the present invention, as illustrated in FIG. 3, to demonstrate how different foods yield differences in digestion, retention of nutrients, and production of waste.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments suitable for use in the present invention have been described, it will be obvious to those skilled in the art that various changes and modifications of the present invention can be made without departing from the spirit and scope of the invention. It is intended to cover, in the appended claims, all such modifications that are within the scope of this invention.

What is claimed is:

1. A demonstration aid system comprising:
  a. a first fillable demonstration aid;
  b. a second fillable demonstration aid;
  c. wherein each said first and said second demonstration aid comprises an upright structure having a bottom surface; front, rear and two side surfaces; and an upper open end; wherein each said upright structure encloses a volume;
  d. wherein each said upright structure further comprises an extended portion protruding upwardly from each of said front, rear and two side surfaces, thereby forming four extended portions, at least two of said extended portions biased outwardly away from a vertical axis of said upright structure to form a collection hopper into which a material can be deposited; and
  e. wherein each said upright structure further comprises a removable drawer disposed partially within and near said bottom surface of each said upright structure, said removable drawer including a front surface that remains flush with said front surface of said upright structure when said removable drawer is fully inserted into said upright structure; wherein said front surface of said removable drawer includes a detail that can be gripped to enable said removable drawer to be slidable into and out of said upright structure; and
  f. further comprising a vertical partition disposed within said upright structure of said first fillable demonstration aid, said vertical partition extending between a lower portion of said collection hopper and a plane that lies immediately above and parallel to an open uppermost portion of said removable drawer of said first fillable demonstration aid; wherein the position of said vertical partition within said upright structure of said first fillable demonstration aid defines two compartments, said compartments defining equal volumes.

2. The system of claim 1 further comprising a vertical partition disposed within said upright structure of said second fillable demonstration aid, said vertical partition extending between said lower portion of said collection hopper and a plane that lies immediately above and parallel to an open uppermost portion of said removable drawer of said second fillable demonstration aid; wherein the position of said vertical partition within said upright structure of said second fillable demonstration aid defines two compartments, said compartments defining unequal volumes.

3. The system of claim 1 wherein one of each of said two compartments of each of said upright structure is located contiguous to said front surface of each said upright structure, through which said front surface each said removable drawer is passable.

4. The system of claim 3 wherein one of each of said two compartments of each of said upright structure is located contiguous to said front surface of each said upright structure, through which said front surface each said removable drawer is passable.

5. The system of claim 1 further comprising a horizontal partition disposed within said first upright structure and extending through said rear surface of said first upright structure, adjacent an inside surface of each said two side surfaces and terminating adjacent an inside surface of said front surface, wherein said horizontal partition forms a floor for said two compartments and is slidably displaceable outwardly a distance sufficient to fully expose an open bottom area of at least one of said two compartments.

6. The system of claim 3 further comprising a horizontal partition disposed within said second upright structure and extending through said rear surface of said second upright structure, adjacent an inside surface of each said two side surfaces, and terminating adjacent an inside surface of said front surface; wherein said horizontal partition forms a floor for said two compartments and is slidably displaceable outwardly a distance sufficient to fully expose an open bottom area of at least one of said two compartments.

7. The system of claim 6 wherein said horizontal partition of said first fillable demonstration aid comprises a stop mechanism.

8. The system of claim 6 wherein said horizontal partition of said first fillable demonstration aid further comprises a detail such that said horizontal partition of said first fillable demonstration aid is grippable along an exposed edge thereof.

9. The system of claim 7 wherein said horizontal partition of said second fillable demonstration aid comprises a stop mechanism.

10. The system of claim 7 wherein said horizontal partition of said second fillable demonstration aid further comprises a detail such that said horizontal partition of said second fillable demonstration aid is grippable along an exposed edge thereof.

11. The system of claim 1 further comprising a second removable drawer disposed in each said first and said second upright structure; said second removable drawer disposed above said removable drawer; wherein said second removable drawer is disposed through said rear surface of each said upright structure and removable to a rear of each said upright structure.

12. The system of claim 10 further comprising a vertical partition disposed within said upright structure of said first fillable demonstration aid, said vertical partition extending between a lower portion of said collection hopper and terminating at a plane that lies immediately above and parallel to an open uppermost portion of said second removable drawer of said first fillable demonstration aid; wherein the position of said vertical partition within said upright structure of said first fillable demonstration aid defines two compartments, said compartments defining equal volumes.

13. The system of claim 11 further comprising a horizontal partition disposed within said first upright structure and extending through said rear surface of said first upright structure, adjacent an inside surface of each said two side surfaces and terminating adjacent an inside surface of said front surface, wherein said horizontal partition forms a floor for said two compartments and is slidably displaceable outwardly a distance sufficient to fully expose an open bottom area of at least one of said two compartments; and wherein said horizontal partition is disposed above and parallel to said open uppermost portion of said second drawer, and below said vertical partition.

14. The system of claim 12 further comprising a vertical partition disposed within said upright structure of said second fillable demonstration aid, said vertical partition extending between said lower portion of said collection hopper and a plane that lies immediately above and parallel to an open uppermost portion of said second removable drawer of said second fillable demonstration aid; wherein the position of said vertical partition within said upright structure of said second fillable demonstration aid defines two compartments, said compartments defining unequal volumes.

15. The system of claim 13 further comprising a horizontal partition disposed within said second upright structure and extending through said rear surface of said second upright structure, adjacent an inside surface of each said two side surfaces and terminating adjacent an inside surface of said front surface, wherein said horizontal partition forms a floor for said two compartments and is slidably displaceable outwardly a distance sufficient to fully expose an open bottom area of at least one of said two compartments; and wherein said horizontal partition is disposed above and parallel to said open uppermost portion of said second drawer, and below said vertical partition.

* * * * *